United States Patent
Pemberton et al.

(10) Patent No.: US 6,692,594 B1
(45) Date of Patent: Feb. 17, 2004

(54) METHOD AND DEVICE FOR PREVENTING CAT FROM CLAWING HOME FURNISHINGS

(76) Inventors: Bonnie M. Pemberton, 2824 6th Ave., Fort Worth, TX (US) 76110; Frank A. Wolfe, 2921 County Rd. 919, Burleson, TX (US) 76028

( * ) Notice: Subject to any disclaimer, the term of this patent is extended or adjusted under 35 U.S.C. 154(b) by 0 days.

(21) Appl. No.: 08/810,049

(22) Filed: Mar. 4, 1997

Related U.S. Application Data
(60) Provisional application No. 60/012,825, filed on Mar. 5, 1996.

(51) Int. Cl.$^7$ .............................................. B32B 31/00
(52) U.S. Cl. ...................... 156/71; 428/41.8; 428/42.2; 428/343
(58) Field of Search ........................... 156/71; 428/41.7, 428/41.8, 42.2, 343

(56) References Cited

U.S. PATENT DOCUMENTS

| | | | |
|---|---|---|---|
| 3,654,059 A | | 4/1972 | Zisblatt |
| 4,061,808 A | * | 12/1977 | Sato ....................... 156/250 X |
| 4,310,137 A | | 1/1982 | Frye |
| 4,348,440 A | * | 9/1982 | Kriozere ................ 428/42.2 X |
| 4,587,146 A | * | 5/1986 | Anhauser et al. ....... 428/42.2 X |
| 4,892,999 A | * | 1/1990 | Wai-Kwan .................. 235/1 D |
| 5,078,154 A | * | 1/1992 | Patel et al. .................. 128/849 |
| 5,210,581 A | * | 5/1993 | Kuzuya .................... 156/277 X |
| 5,215,089 A | * | 6/1993 | Baker, Jr. .................... 600/377 |
| 5,265,069 A | * | 11/1993 | Wardle ........................ 367/173 |
| 5,322,257 A | | 6/1994 | Verderose et al. |
| 5,859,699 A | * | 1/1999 | Baer et al. ................... 356/246 |

FOREIGN PATENT DOCUMENTS

| | | | | |
|---|---|---|---|---|
| CH | 605320 | * | 12/1977 | |
| DE | 3326132 | * | 7/1983 | |
| DE | 3833517 | * | 4/1990 | |
| GB | 2254289 | * | 10/1992 | ................ 428/41.8 |
| IT | 590156 | * | 3/1959 | ................ 428/42.2 |

OTHER PUBLICATIONS

Multi–Purpose Labels Package; Avery Dennison Corporation; Diamond Bar, CA, 1993.*

Basic Training for Your Cat; pp. 1–2; Bohnenkamp, Perfect Paws, Inc.; Internet Site, 1995.*

Claws and All: Living With YOur Cat, Your Furniture, and Your Peace of Mind; pp. 1–4; HSUS News; Internet Site, 1996.*

The Declawing Issue; Proulx, Lawrence; Washington Post Health Section; p. 11. Mar. 1998.*

* cited by examiner

*Primary Examiner*—Mark A. Osele

(57) ABSTRACT

An array of strips is affixed to a transfer sheet, with the strips uniformly spaced apart. Each strip has a transparent plastic film with an adhesive coating on both sides of the strip. A release layer is affixed each film. A strip is peeled from the transfer sheet so that the adhesive coating is exposed. The user then presses a strip against an item of furniture in a typical area where a cat may tend to "sharpen" its claws. Finally, the release layer is peeled from the strip, thereby exposing the other adhesive coating. When a cat attempts to scratch the furniture, its paw contacts and receives an unpleasant sticking sensation from the exposed adhesive coating, deterring the cat from future contact with that item of furniture. Another embodiment has a rigid substrate with an adhesive side and a release layer. After the release layer is peeled from the strip, the adhesive is exposed and the strip is placed on the soil of a potted houseplant. The adhesive on the substrate deters a cat from future contact with the soil of the houseplant.

5 Claims, 2 Drawing Sheets

METHOD AND DEVICE FOR PREVENTING CAT FROM CLAWING HOME FURNISHINGS

This application claims the benefit of provisional application serial No. 60/012,825, filed on Mar. 5, 1996, in the U.S. Patent & Trademark Office.

TECHNICAL FIELD

This invention relates in general to animal control methods, and in particular to a method for preventing pets from clawing furniture or digging in potted plants.

BACKGROUND ART

Some household pets such as cats tend to naturally claw at or scratch home furnishings. If allowed to continue, such activity can significantly deface and even damage the furniture. There are a number of methods for deterring pets from causing this unwanted activity. One such method employs a plastic furniture cover which can be affixed to the sides of the furniture, but is heavy enough to withstand scratching by pets. However, this cover can be unsightly and can also become defaced after repeated scratching.

DISCLOSURE OF INVENTION

An array of rectangular strips is affixed to a paper transfer sheet, the strips being uniformly spaced apart. Each strip has a plastic film with an adhesive coating on both sides of the strip. The strips and coatings are preferably transparent so as to appear substantially invisible when affixed to furniture. The upper surface of the transfer sheet is treated with paraffin to facilitate easy removal of the strips from the transfer sheet. A paper release layer is affixed to one side of each film. The lower surface of the release layer is also treated with paraffin to facilitate easy removal of the release layer from the film.

The strip is peeled from the transfer sheet so that the adhesive coating is exposed. The user then presses a strip against an item of furniture in a typical area where a cat may tend to "sharpen" its claws. The coating on the transfer sheet side of the strip removably affixes the strip to a fabric home furnishing such as drapery or an item of furniture. Finally, the release layer is peeled from the strip, thereby exposing the other adhesive coating. These steps are then repeated for each surface on the furniture that is susceptible to be scratched. Since the strip is transparent, it is not readily visible after the release layer is removed. When a cat attempts to scratch the furniture, its paw contacts and receives an unpleasant sticking sensation from the exposed adhesive coating, deterring the cat from future contact with that item of furniture.

In an alternate embodiment of the invention, a strip has a rectangular, corrugated plastic substrate which provides the backing for an adhesive coating located on an upper side of strip. The substrate is fairly rigid and is preferably colored to blend in with soil. If necessary, the strip may be cut or trimmed to meet a particular application.

The release layer is peeled from the strip, thereby exposing the adhesive. The strip is then placed in a potted houseplant so that the lower, nonadhesive side of the substrate lies in contact with the soil. Preferably, a plurality of the strips are placed on the soil and overlapped transverse to one another. When the strips are overlapped, the coating on one strip sticks to the non-coated side of another strip. This alignment creates an array of strips that is not easily lifted by a pet. When a cat attempts to dig in the soil, it contacts and receives an unpleasant sticking sensation from the exposed adhesive coating and is deterred from future contact with the soil of the houseplant.

BEST MODE FOR CARRYING OUT THE INVENTION

Figure 1:
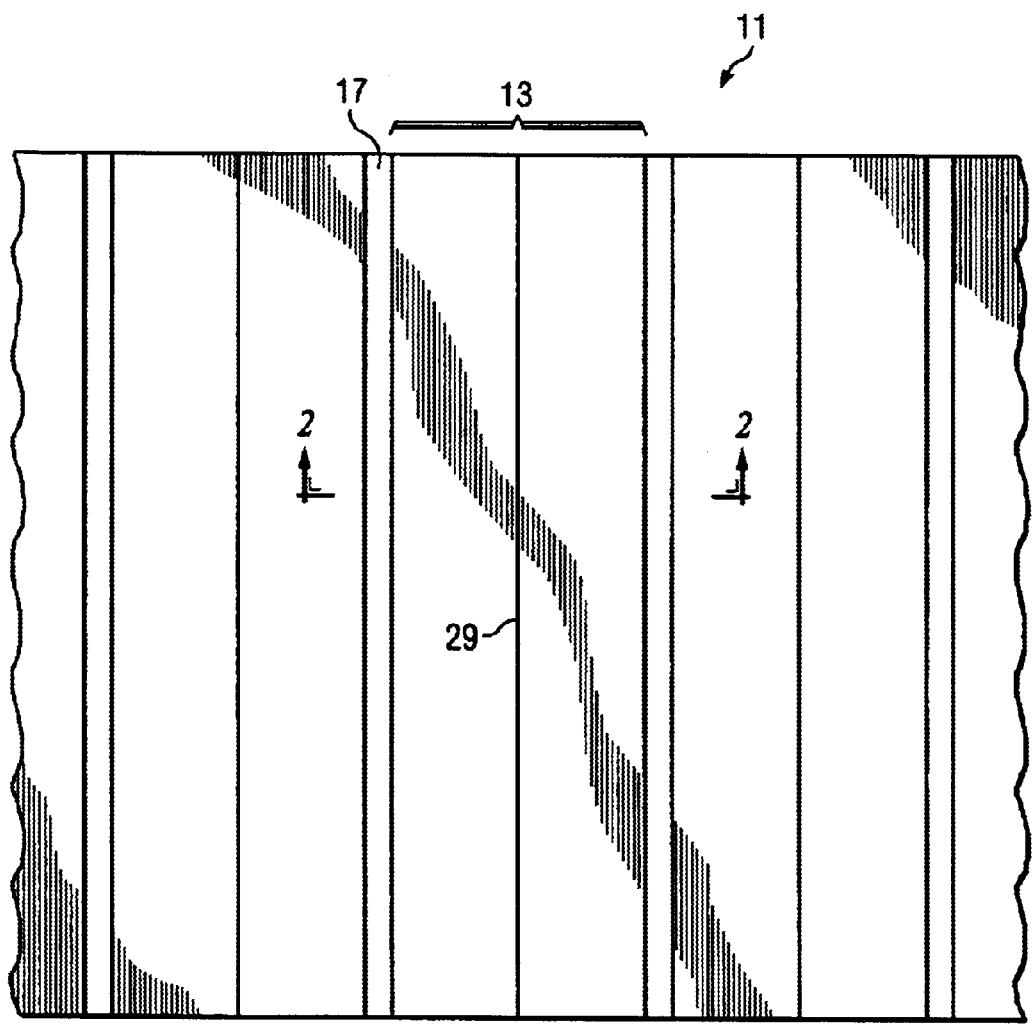
FIG. 1 is a plan view of an array of strips utilized in a method for preventing cats from clawing furniture and is constructed in accordance with the invention.
Figure 2:
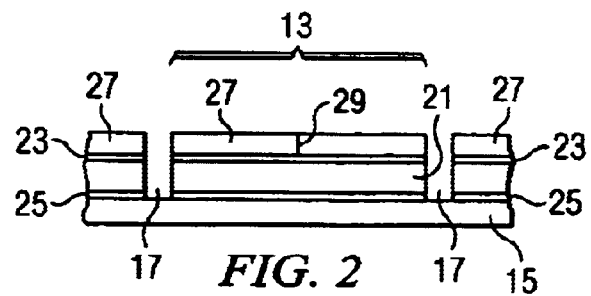
FIG. 2 is an enlarged, partial sectional view of the strips of FIG. 1 taken along the line 2—2 in FIG. 1.

Referring to FIGS. 1 and 2, an array 11 of multilaminate, rectangular strips 13 is shown. Each strip 13 is approximately twelve inches long and two inches wide. Strips 13 are affixed to a paper transfer sheet 15 and are uniformly spaced apart from one another by gaps 17. Each strip 13 has a plastic substrate or film 21 which provides the backing for two adhesive coatings 23, 25 located on both sides of strip 13. Strips 13 and coatings 23, 25 are preferably transparent so as to appear substantially invisible when affixed to furniture. Coatings 23, 25 are preferably acrylic or a similar water soluble adhesive and can easily be cleansed from home furnishing fabrics. Coating 25 creates a releasable bond between film 21 and transfer sheet 15. The upper surface of transfer sheet 15 is treated with paraffin to facilitate easy removal of strips 13 from transfer sheet 15. A paper protective or release layer 27 is affixed to film 21 above coating 23. The lower surface of release layer 27 is treated with paraffin to facilitate easy removal of release layer 27 from film 13. In the embodiment shown, release layer 27 is longitudinally bisected into two separate portions as shown by cut 29.

Figure 3:
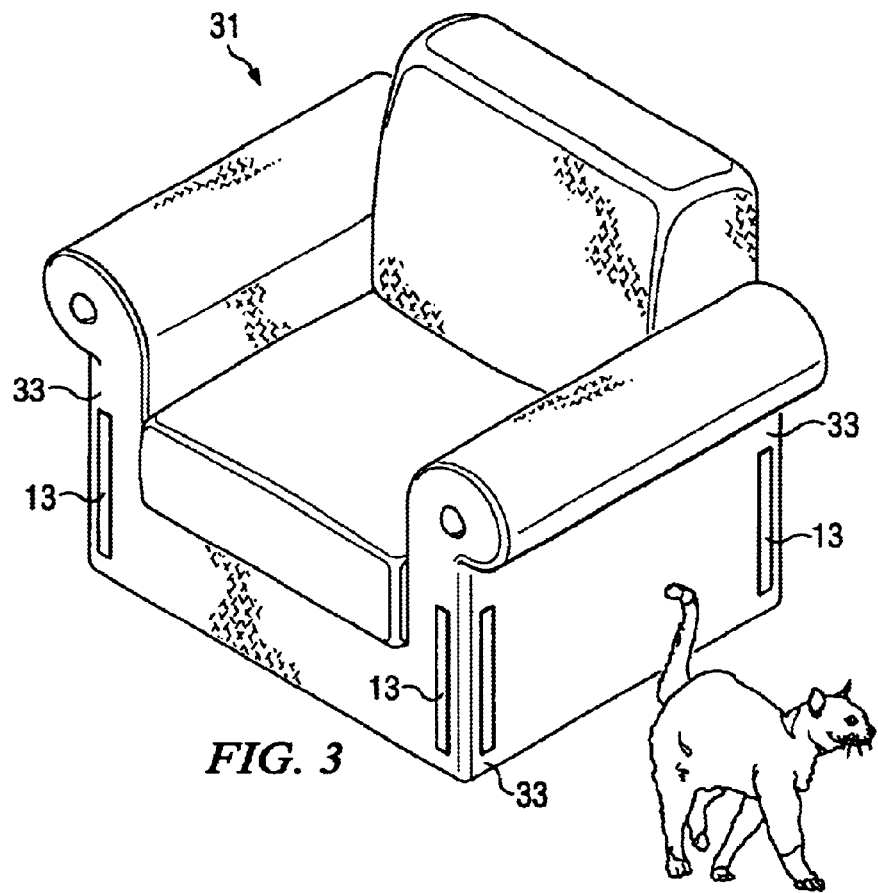
FIG. 3 is a schematic drawing of the strips of FIG. 1 affixed to a piece of furniture.

In operation, a strip 13 is peeled from transfer sheet 15 so that adhesive coating 25 is exposed. Gaps 17 between strips 13 provide an indication of the side margins of each strip 13 so as to not confuse cut 29 with the side margins. Referring to FIG. 3, the user then presses strip 13 against an item of furniture 33, a countertop, or other object where a cat may tread or tend to "sharpen" its claws. Coating 25 removably affixes strip 13 to fabric home furnishings such as drapery or an item of furniture 31 along an outer surface 33. If necessary, strip 13 may be repositioned after it is affixed to furniture 31. Finally, release layer 27 is easily removed from strip 13 by peeling the two portions of release layer 27 along cut 29, thereby exposing coating 23. These steps are then repeated for each surface 33 on furniture 31 that is susceptible to be scratched. Since it is transparent, strip 13 is not readily visible after release layer 27 is removed. When a cat attempts to scratch furniture 31, its paw contacts and receives an unpleasant sticking sensation from exposed adhesive coating 23, deterring the cat from future contact with that item of furniture 31. Coating 25 is of sufficient strength so as to remain affixed to furniture 31 when cats or other pets attempt to scratch furniture 31.

Figure 4:
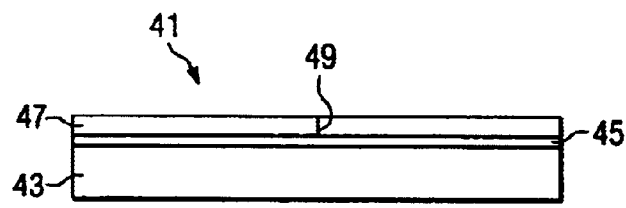
FIG. 4 is a sectional view of an alternate embodiment of the invention.

An alternate embodiment of the invention is shown in FIG. 4. Strip 41 has a rectangular corrugated plastic substrate 43 which provides the backing for an adhesive coating 45 located on an upper side of strip 41. There is no coating of adhesive on the lower side of strip 41. Substrate 43 and coating 45 are impervious to water. Substrate 43 is fairly rigid and is preferably colored to blend in with soil. Coating 45 creates a bond between substrate 43 and a paper release layer 47. The lower surface of release layer 47 is treated with paraffin to facilitate easy removal of release layer 47 from substrate 43. Release layer 47 is longitudinally bisected into two portions by a cut 49. The size of each strip 41 may vary, but is typically about the same size as strip 13 of the first embodiment. If necessary, strip 41 may be cut or trimmed to meet a particular application.

Figure 5:
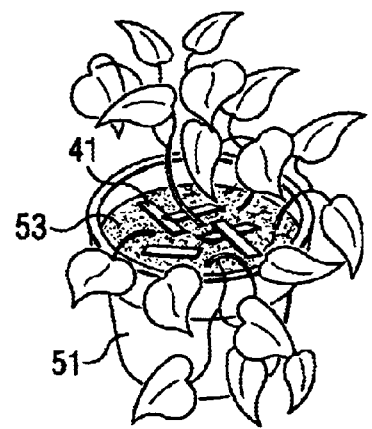
FIG. 5 is a schematic drawing of the embodiment of FIG. 4 in use.

In operation, release layer 47 is easily removed from strip 41 by peeling release layer 47 along cut 49, thereby exposing coating 45. Referring to FIG. 5, strip 41 is placed in a potted houseplant 51 so that the lower, nonadhesive side of substrate 43 lies in contact with soil 53. Preferably, a plurality of strips 41 are placed on soil 53 and overlapped transverse to one another. When strips 41 are overlapped, the coating 45 on one strip 41 sticks to the non-coated side of another strip 41. This alignment creates an array of strips that is not easily lifted by a pet. When a cat attempts to dig in soil 53, it contacts and receives an unpleasant sticking sensation from exposed adhesive coating 45 and is deterred from future contact with soil 53 of houseplant 51.

The present invention has several advantages. This method provides an invisible barrier for pet owners whose pets scratch their furniture. This method also offers a more fundamental solution to the problem by actually deterring the unwanted behavior rather than simply preventing the furniture from being damaged.

It should be apparent from the foregoing that an invention having significant advantages has been provided. While the invention is shown in only two of its forms, it is not just limited but is susceptible to various changes and modifications without departing from the spirit thereof.

We claim:

1. A method for deterring pets from digging in soil, comprising:
    (a) providing at least one strip with a rigid substrate, an upper side coated with an adhesive and a release layer over the adhesive;
    (b) removing the release layer from the strip so that the adhesive is exposed; and
    (c) placing the strip on the soil to be protected with the adhesive exposed.

2. The method of claim 1 wherein step (a) comprises providing the strip with a color that blends in with soil.

3. The method of claim 1 wherein step (a) making the rigid substrate of the strip water-resistant.

4. The method of claim 1 wherein step (a) comprises providing the strip with a nonadhesive lower side.

5. The method of claim 1 wherein step (a) comprises providing a plurality of the strips; and wherein
    step (c) comprises overlaying at least some of the strips transverse to one another, thereby creating an array of the strips.

* * * * *